(12) United States Patent
Oda et al.

(10) Patent No.: US 8,488,975 B2
(45) Date of Patent: Jul. 16, 2013

(54) OPTICAL TRANSMITTER, OPTICAL TRANSMITTER AND RECEIVER SYSTEM, OPTICAL TRANSMITTING METHOD AND OPTICAL TRANSMITTING AND RECEIVING METHOD

(75) Inventors: Shoichiro Oda, Kawasaki (JP); Takeshi Hoshida, Kawasaki (JP); Takahito Tanimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 218 days.

(21) Appl. No.: 12/911,395

(22) Filed: Oct. 25, 2010

(65) Prior Publication Data
US 2011/0097085 A1 Apr. 28, 2011

(30) Foreign Application Priority Data
Oct. 28, 2009 (JP) ................................. 2009-247816

(51) Int. Cl.
*H04B 10/00* (2006.01)

(52) U.S. Cl.
USPC ............. 398/158; 398/96; 398/102; 398/159; 398/183; 398/192; 398/193; 398/194; 398/204; 398/205; 398/208

(58) Field of Classification Search
USPC ..... 398/65, 98, 102, 147–150, 159, 182–185, 398/192–194, 202–208
See application file for complete search history.

(56) References Cited

U.S. PATENT DOCUMENTS

| | | | | |
|---|---|---|---|---|
| 5,703,708 | A * | 12/1997 | Das et al. ...................... | 398/102 |
| 6,141,127 | A * | 10/2000 | Boivin et al. .................. | 398/92 |
| 6,310,709 | B1 * | 10/2001 | Bergano ........................ | 398/185 |
| 6,570,688 | B2 * | 5/2003 | LaGasse ....................... | 398/102 |
| 7,756,421 | B2 | 7/2010 | Roberts et al. | |
| 2002/0012492 | A1 | 1/2002 | Takahashi et al. | |
| 2003/0007213 | A1 | 1/2003 | Lach | |
| 2004/0197103 | A1 * | 10/2004 | Roberts et al. ................ | 398/159 |
| 2007/0206954 | A1 * | 9/2007 | Fishman et al. ............... | 398/159 |
| 2008/0232815 | A1 | 9/2008 | Shioiri et al. | |
| 2010/0247099 | A1 * | 9/2010 | Lowery et al. ................. | 398/79 |

FOREIGN PATENT DOCUMENTS

| | | |
|---|---|---|
| GB | 2316821 A | 3/1998 |
| WO | WO-2004/032386 A1 | 4/2004 |

OTHER PUBLICATIONS

Hodzic, Anes et al., "Improvement of System Performance in Nx40-Gb/s WDM Transmission Using Alternate Polarizations", IEEE Photonics Technology Letters, Vol. 15, No. 1 Jan. 2003, pp. 153-155.
Extended European Search Report, dated Feb. 25, 2011, for corresponding European Application No. 10189205.7.
Weber et al., "Ultrahigh-Speed OTDM-Transmission Technology," Journal of Lightwave Technology, IEEE Service Center, New York, NY, US, vol. 24, No. 12, Dec. 1, 2006, pp. 4616-4627, XP011156031.

* cited by examiner

*Primary Examiner* — Li Liu
(74) *Attorney, Agent, or Firm* — Fujitsu Patent Center

(57) ABSTRACT

An optical transmitter includes: a pre-compensator calculating an electrical field of an optical signal subjected to an electronic pre-compensation with respect to an input digital signal; a parallelizer parallelizing the electrical field of the optical signal calculated by the pre-compensator; a plurality of optical modulators modulating an optical signal based on each of parallelized electrical fields of optical signals; and a time-division multiplexer time-division-multiplexing an optical signal output from the plurality of the optical modulators.

9 Claims, 10 Drawing Sheets

SAMPLING

OPTICAL TRANSMITTER, OPTICAL TRANSMITTER AND RECEIVER SYSTEM, OPTICAL TRANSMITTING METHOD AND OPTICAL TRANSMITTING AND RECEIVING METHOD

CROSS-REFERENCE TO RELATED APPLICATION

This application is based upon and claims the benefit of priority of the prior Japanese Patent Application No. 2009-247816, filed on Oct. 28, 2009, the entire contents of which are incorporated herein by reference.

FIELD

A certain aspect of embodiments described herein relates to an optical transmitter, an optical transmitter and receiver system, an optical transmitting method and an optical transmitting and receiving method.

BACKGROUND

It is known that electronic pre-compensation is effective as a technology compensating for linear waveform distortion and non-linear waveform distortion of an optical transmission link. The technology is disclosed in U.S. Patent Application Publication No. 2004/0197103.

However, the technology needs high-speed electronic devices for generating an optical signal at high symbol rate subjected to the electronic pre-compensation.

SUMMARY

According to an aspect of the present invention, there is provided an optical transmitter including: a pre-compensator calculating an electrical field of an optical signal subjected to an electronic pre-compensation with respect to an input digital signal; a parallelizer parallelizing the electrical field of the optical signal calculated by the pre-compensator; a plurality of optical modulators modulating an optical signal based on each of parallelized electrical fields of optical signals; and a time-division multiplexer time-division-multiplexing an optical signal output from the plurality of the optical modulators.

According to an aspect of the present invention, there is provided an optical transmitter and receiver system including: an optical transmitter having a pre-compensator, a parallelizer, a plurality of optical modulators and a time-division multiplexer, the pre-compensator calculating an electrical field of an optical signal subjected to an electronic pre-compensation with respect to an input digital signal, the parallelizer parallelizing the electrical field of the optical signal calculated by the pre-compensator, the plurality of optical modulators modulating an optical signal based on each of parallelized electrical fields of optical signals, the time-division multiplexer time-division-multiplexing an optical signal output from the plurality of the optical modulators; and an optical receiver having a waveform detector detecting a waveform with use of local oscillation light including a repeating pulse with respect to an optical signal input from the optical transmitter through a transmission link, wherein a repeating frequency of the local oscillation light is the same as a frequency of polarization rotation of an optical signal output from the optical transmitter.

According to an aspect of the present invention, there is provided an optical transmitting method including: calculating an electrical field of an optical signal subjected to an electronic pre-compensation with respect to an input digital signal; parallelizing the electrical field of the optical signal calculated by the calculating of the electrical field of the optical signal; modulating an optical signal based on each of parallelized electrical fields of optical signals in each of optical modulators; and time-division-multiplexing an optical signal output from the optical modulators.

According to an aspect of the present invention, there is provided an optical transmitting and receiving method including: detecting a waveform with use of a local oscillation light including a repeating pulse with respect to an optical signal transmitted according to an optical transmitting method, the method comprising: calculating an electrical field of an optical signal subjected to an electronic pre-compensation with respect to an input digital signal; parallelizing the electrical field of the optical signal calculated by the calculating of the electrical field of the optical signal; modulating an optical signal based on each of parallelized electrical fields of optical signals in each of optical modulators; and time-division-multiplexing an optical signal output from the optical modulators, wherein a repeating frequency of the local oscillation light is the same as a frequency of polarization rotation of the optical signal transmitted according to the optical transmitting method The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

The following is a description of embodiments of the present invention, with reference to the accompanying drawings.

[a] First Embodiment

Figure 1:
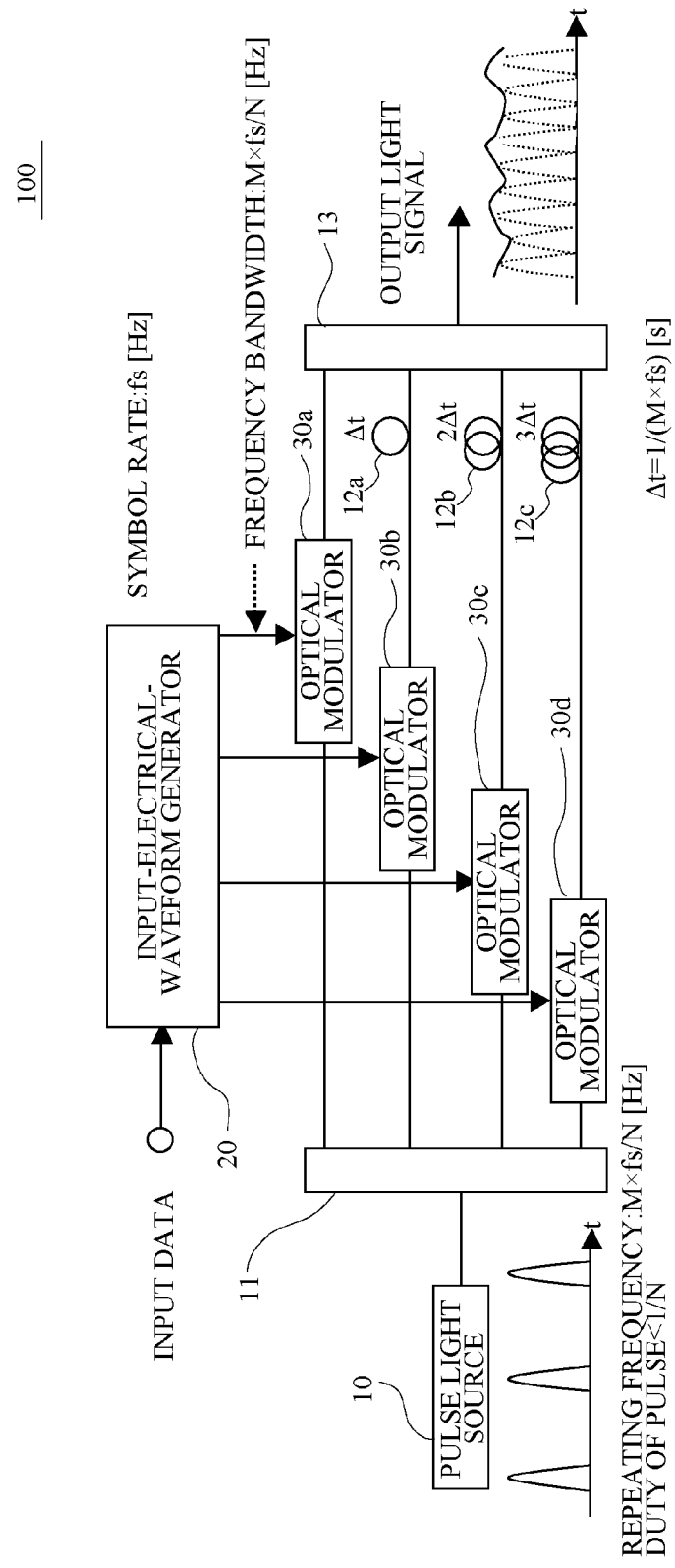
FIG. 1 illustrates a block diagram of an overall structure of an optical transmitter in accordance with a first embodiment.

FIG. 1 illustrates a block diagram of an overall structure of an optical transmitter 100 in accordance with a first embodiment. As illustrated in FIG. 1, the optical transmitter 100 has a pulse light source 10, a divider 11, an input-electrical-waveform generator 20, optical modulators 30a to 30d, delays 12a to 12c and a composer 13.

The pulse light source 10 outputs a pulsed optical signal. For example, a semiconductor laser having a modulator integrally is used as the pulse light source 10. A repeating frequency of the pulsed optical signal from the pulse light source 10 is set to be M×fs/N [Hz]. A duty of the pulse of the pulse light source 10 is set to be less than 1/N. The "fs" is a symbol rate [Hz] of an input data signal fed into the optical transmitter 100. The "M" is an integer that is equal to 1 or more. The "N" is a division number of an optical signal divided by the divider 11 and is an integer that is equal to 2 or more.

The divider 11 is an optical coupler for dividing an output light from the pulse light source 10 into a plurality of lights. In the embodiment, the division number "N" is, for example, four. An optical modulator is provided on each transmission path of divided lights. In the embodiment, each of the optical modulators 30a to 30d is provided on each of four transmission paths.

Each of the delays 12a to 12c is provided on each of three of the four transmission paths. A delay amount of the delay 12a is Δt. A delay amount of the delay 12b is 2Δt. A delay amount of the delay 12c is 3Δt. In this way, a delay amount of the four transmission paths differs by Δt. The "Δt" is set according to the symbol rate "fs". For example, "Δt" is set to be 1/(M×fs) [s]. In the embodiment, the delay 12a is provided on a transmission path where the optical modulator 30b is provided, the delay 12b is provided on an optical transmission path where the optical modulator 30c is provided, and the delay 12c is provided on an optical transmission path where the optical modulator 30d is provided. The composer 13 is an optical coupler composing optical signals of the four transmission paths.

The input data signal fed into the optical transmitter 100 is fed into the input-electrical-waveform generator 20. The input-electrical-waveform generator 20 is made of a digital signal processor, a field programmable gate array, an application specific integrated circuit, and so on. The input-electrical-waveform generator 20 is a digital processor for electronic pre-compensating at electrical field with respect to an optical signal that is a modulation objective at the optical modulators 30a to 30d.

In the embodiment, the input-electrical-waveform generator 20 calculates an electrical field of a modulated optical signal subjected to at least one of a linear pre-equalizing and a non-linear pre-equalizing as a pre-compensating in an electrical field. The input-electrical-waveform generator 20 calculates an electrical field for polarization rotation of the modulated signal. Further, the input-electrical-waveform generator 20 takes a sample at a frequency that is M times as high as a frequency bandwidth of an optical signal according to the electrical field. The "M" is an integer equal to one or more. The input-electrical-waveform generator 20 parallelizes the sampled value obtained by the sampling into 1: N and inputs each of the parallelized values into the optical modulators 30a to 30d.

The optical modulators 30a to 30d modulates an output light from the pulse light source 10 according to the electrical signal generated in the input-electrical-waveform generator 20. The delays 12a to 12c and the composer 13 time-division multiplexes signals modulated by the optical modulators 30a to 30d. In the embodiment, the four modulated signals time-divided by Δt are multiplexed. The optical signal after the time-division-multiplexing is transmitted to the optical transmitter through a transmission link such as an optical fiber.

Figure 2:
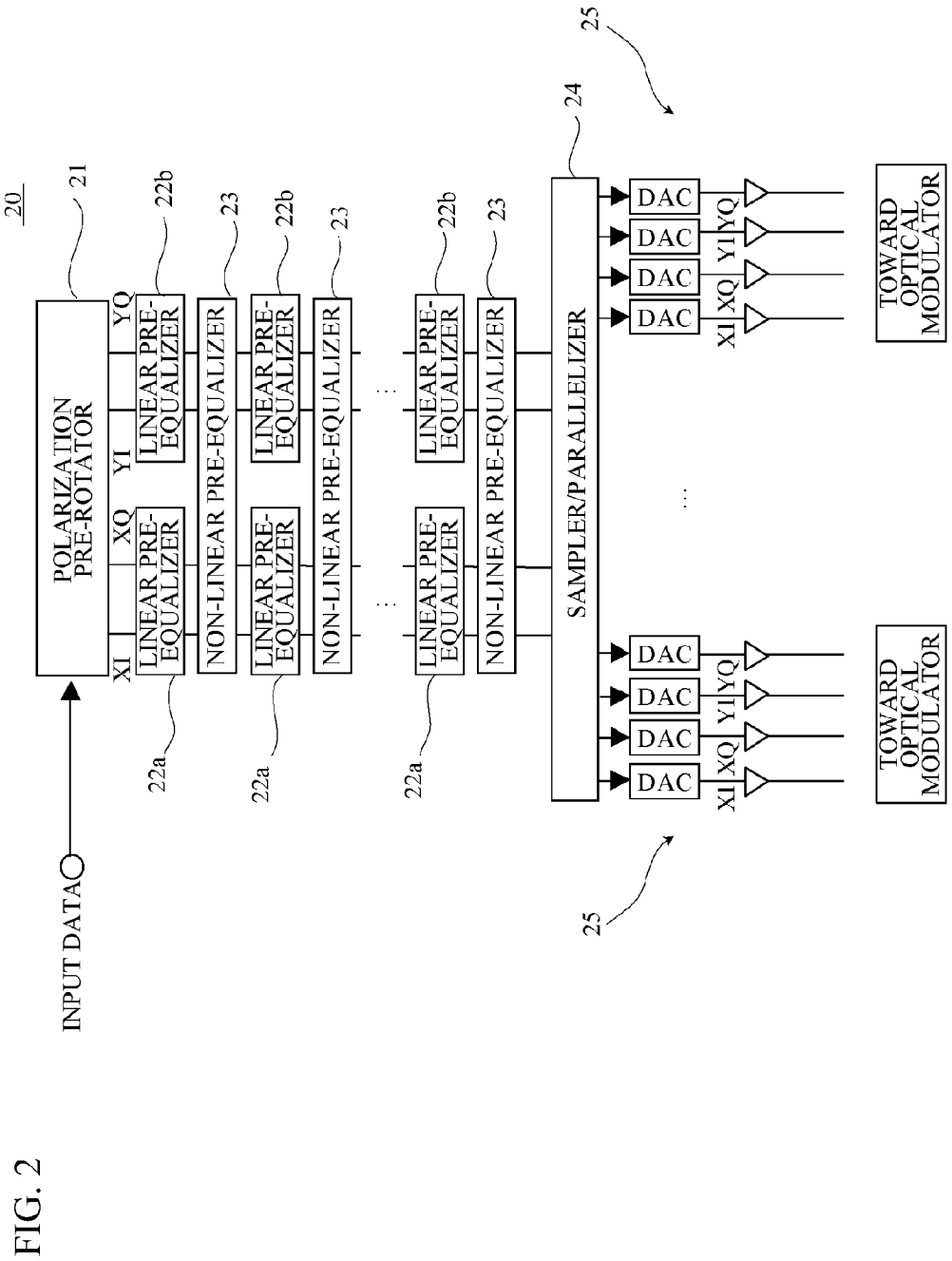
FIG. 2 illustrates details of an input-electrical-waveform generator.

A description will be given of each component. FIG. 2 illustrates details of the input-electrical-waveform generator 20. As illustrated in FIG. 2, the input-electrical-waveform generator 20 includes a polarization pre-rotator 21 and a pre-equalizer. The pre-equalizer includes a linear pre-equalizer 22a for an X-polarized wave, a linear pre-equalizer 22b for a Y-polarized wave and a non-linear pre-equalizer 23. As illustrated in FIG. 2, there may be a plurality of the pre-equalizers.

The polarization pre-rotator 21 converts an input signal (Ex0, Ey0) including two orthogonal polarized waveforms by the following Equation (1). With the signal conversion process of Equation (1), the input signal (Ex0, Ey0) is converted into (Ex, Ey). In Equation (1), the input signal (Ex0, Ey0) for modulation is converted into (Ex, Ey). Therefore, for an optical signal obtained by a modulation at the optical modulators 30a to 30d, the polarization pre-rotator 21 converts a transmission electrical field of an optical signal.

$$E(Z, t) = \begin{pmatrix} E_x \\ E_y \end{pmatrix} = \begin{pmatrix} \cos\omega_r t & -\sin\omega_r t \\ \sin\omega_r t & \cos\omega_r t \end{pmatrix} \begin{pmatrix} E_{x0} \\ E_{y0} \end{pmatrix} \quad [\text{Equation (1)}]$$

Figure 3A:
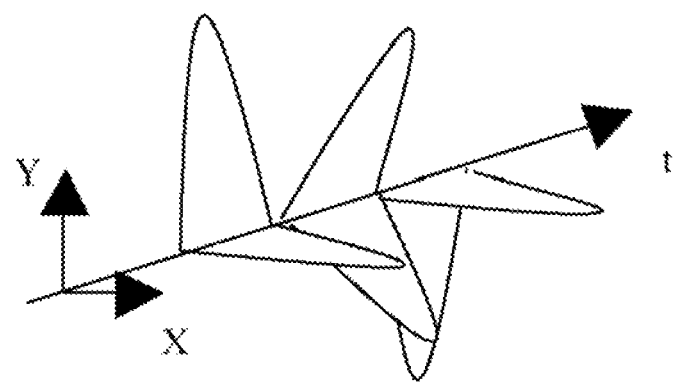
FIG. 3A illustrates an optical signal that is polarization-rotated by a polarization pre-rotator.

In Equation (1), a value of the input signal is rotated (scrambled) with an angle rate $\omega_r t$. The "$\omega_r$" is $2\pi fs/K$. The "K" is a real number and satisfies a condition "K>0". In this case, the polarized wave rotation frequency is "fs/K". FIG. 3A illustrates an example of an optical signal that is polarization-rotated by the polarization pre-rotator 21.

The linear pre-equalizer 22a pre-equalizes a transmission electrical field signal Ex (=XI+iXQ) according to a linear property of a transmission link of an optical signal transmitted from the optical transmitter 100. The transmission electrical field signal Ex is a result of a polarization scrambling at the polarization pre-rotator 21. The "XI" is an I-phase (In-phase) wave of the X-polarization. The "XQ" is a Q-phase (Quadrature-phase) wave of the X-polarization. Similarly, the linear pre-equalizer 22b pre-equalizes a transmission electrical field signal Ey (=YI+iYQ) according to the linear property of the transmission path of the optical signal. The transmission electrical field signal Ey is the result of the polarization scrambling at the polarization pre-rotator 21. Here, the "i" is an imaginary unit. An amount of the pre-equalization of the linear pre-equalizers 22a and 22b may be determined according to a measurement result of a linear property of a transmission link.

Figure 3B:
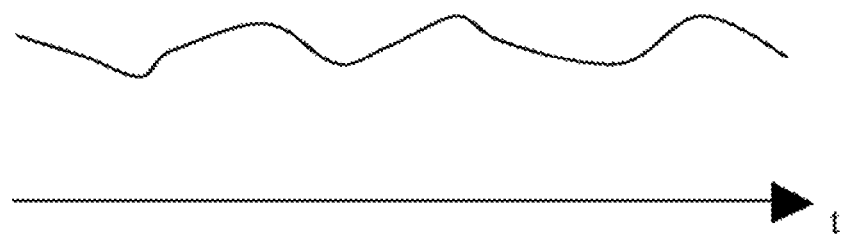
FIG. 3B illustrates an optical signal according to a data that is pre-equalized.

The non-linear pre-equalizer 23 pre-equalizes the transmission electrical fields Ex and Ey after the linear pre-equalization according to the non-linear property of the transmission link of the optical signal transmitted from the optical transmitter 100. An amount of the pre-equalization of the non-linear pre-equalizer 23 may be determined according to a measurement result of a non-linear property of a transmission link. FIG. 3B illustrates an optical signal according to the data (Ex and Ey) pre-equalized by the linear pre-equalizers 22a and 22b and the non-linear pre-equalizer 23.

Figure 3C:
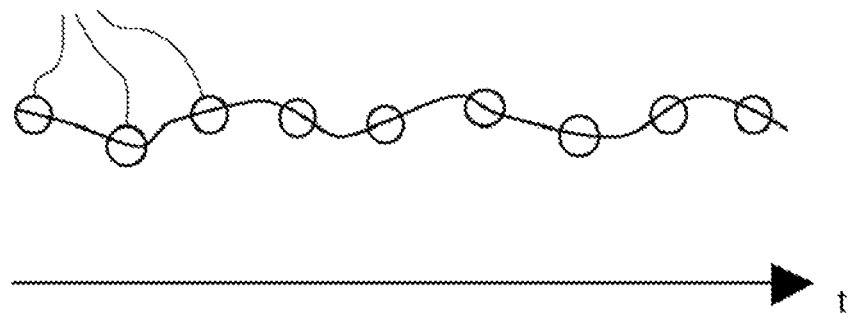
FIG. 3C illustrates a sampling of a sampler/parallelizer.

A sampler/parallelizer 24 takes a sample with respect to an optical signal according to the data (Ex and Ey) that is pre-equalized by the linear pre-equalizers 22a and 22b and the non-linear pre-equalizer 23 at a frequency that is M times as high as that of the optical signal. FIG. 3C illustrates the sampling result of the sampler/parallelizer 24. A circle in FIG. 3C indicates a sampling point. The sampler/parallelizer 24 parallelizes the sampling value into N sampling values and outputs them. The "N" is the number of division at the divider 11. The D/A (digital/analog) converter 25 converts the output data of the sampler/parallelizer 24 into an analog signal. The D/A converter 25 converts each of the XI waveform, the XQ waveform, the YI waveform and the YQ waveform into analog signals, amplifies them and outputs the amplified analog signals as driving signals of the optical modulators 30a to 30d.

Figure 4:
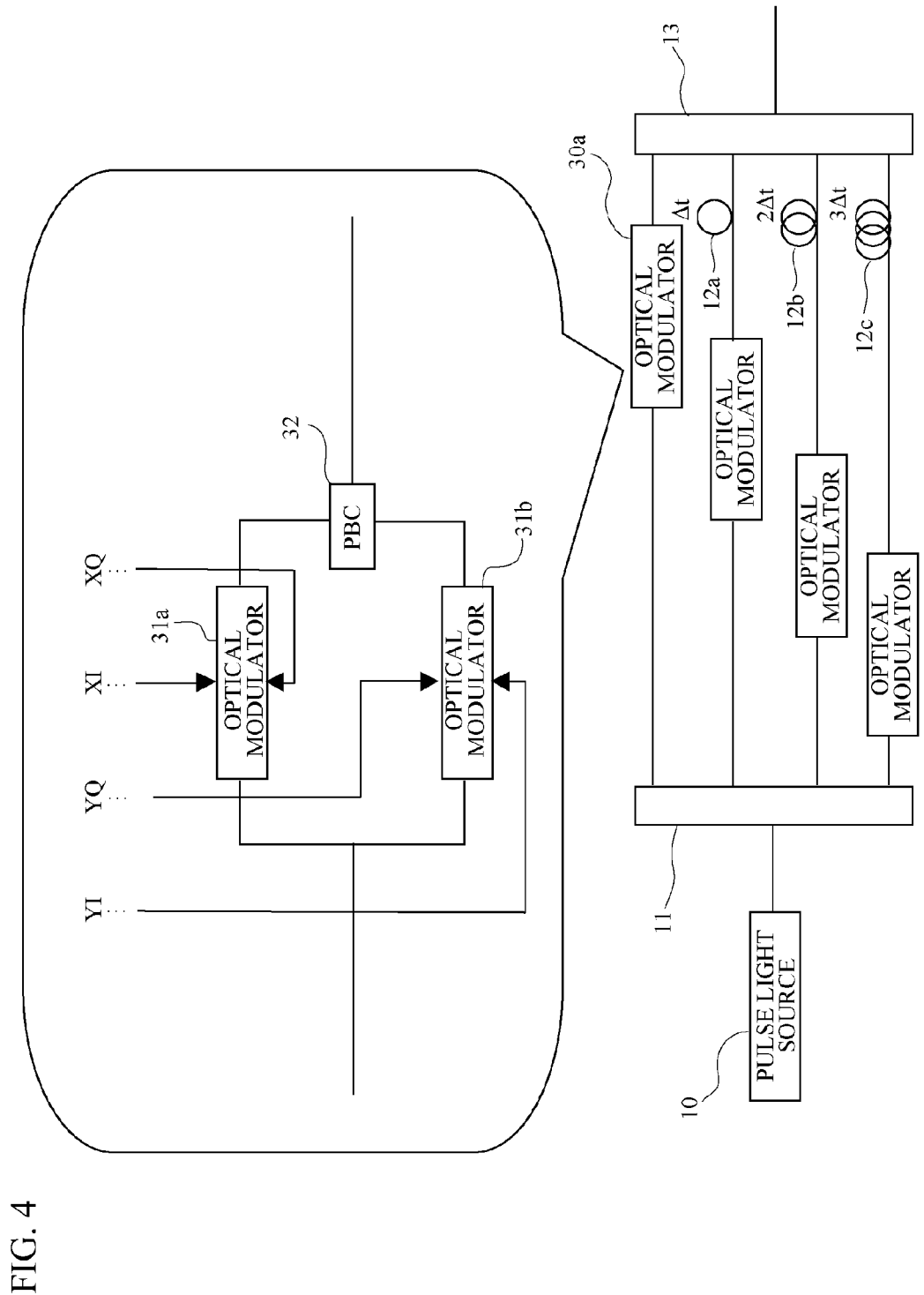
FIG. 4 illustrates details of an optical modulator.

FIG. 4 illustrates details of the optical modulator 30a. As illustrated in FIG. 4, the optical modulator 30a includes the optical modulators 31a and 31b and a PBC (Polarization Beam Coupler) 32. An optical signal fed into the optical modulator 30a is divided at the optical modulator 30a. Each of the divided optical signals is fed into each of the optical modulators 31a and 31b.

The input-electrical-waveform generator 20 inputs the XI waveform and the XQ waveform into the optical modulator 31a. The optical modulator 31a modulates an optical signal of the pulse light source 10 based on the XI waveform and the XQ waveform. The input-electrical-waveform generator 20 inputs the YI waveform and the YQ waveform into the optical modulator 31b. The optical modulator 31b modulates an optical signal of the pulse light source 10 based on the YI waveform and the YQ waveform. The polarization beam coupler 32 composes a modulated light from the optical modulator 31a and a modulated light from the optical modulator 31b with use of the orthogonal polarizations. The optical modulators 30b to 30d have the same structure as the optical modulator 30a.

A polarization condition of an optical signal modulated with a driving signal corresponding to the data (Ex and Ey) is scrambled, as compared to a case where the input signals Ex0 and Ey0 are modulated at the optical modulator 30a. Thus, with the digital signal processing at the input-electrical-waveform generator 20, the polarizations are scrambled with respect to the optical signal from the optical transmitter 100.

The delay 12a adds a delay amount Δt to the optical signal modulated by the optical modulator 30b. The delay 12b adds a delay amount 2Δt to the optical signal modulated by the optical modulator 30c. The delay 12c adds a delay amount 3Δt to the optical signal modulated by the optical modulator 30d. Thus, the composer 13 time-division multiplexes the modulated signals from the optical modulators 30a to 30d.

The optical transmitter 100 in accordance with the embodiment parallelizes the optical signal electrical field subjected to the electronic pre-compensation and time-division multiplexes the optical single after the modulation. Therefore, a required frequency bandwidth width is reduced to 1/N. An optical signal at high symbol rate may be generated without the use of high-speed electronic devices. Transmission degradation by PDL (Polarization Dependent Loss) may be mitigated because an optical signal is polarization-rotated at high speed. A non-linear mutual interaction in a channel is mitigated because the polarization of optical signals of time slots adjacent to each other are not the same.

Figure 5:
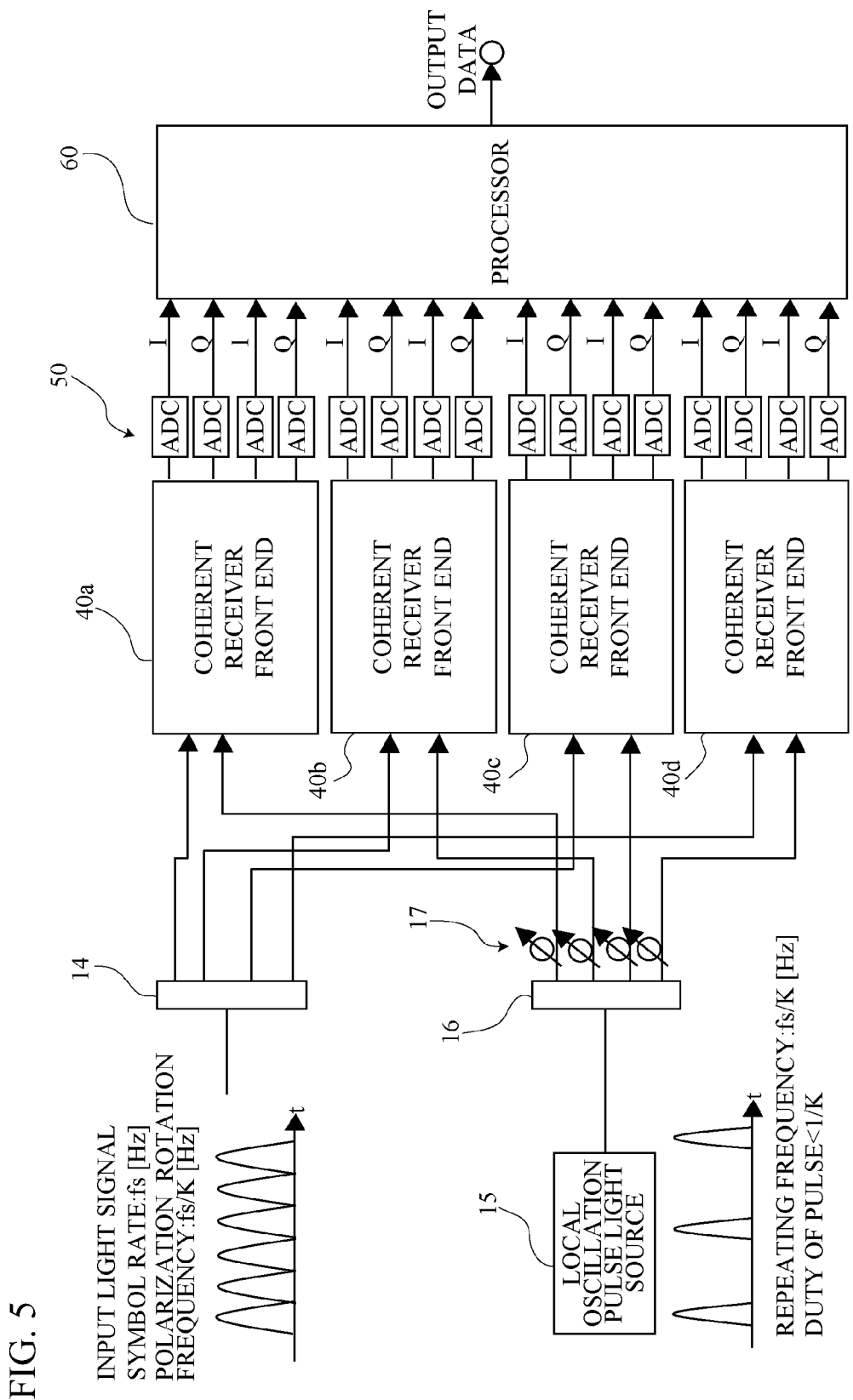
FIG. 5 illustrates a block diagram of an overall structure of an optical receiver.

FIG. 5 illustrates a block diagram of an overall structure of an optical receiver 200 for receiving an optical signal transmitted from the optical transmitter 100. As illustrated in FIG. 5, the optical receiver 200 includes a divider 14, a local oscillation pulse light source 15, a divider 16, a delay 17, coherent receiver front ends 40a to 40d, an analog/digital (A/D) converter 50 and a processor 60.

The divider 14 divides a received light. The number of the divided lights is the same as that of the coherent receiver front ends. In FIG. 5, the divider 14 divides the received light into four lights and inputs each of the four lights into each of the coherent receiver front ends 40a to 40d. The local oscillation pulse light source 15 is a light source outputting a local oscillation light for optical waveform detection at the coherent receiver front ends 40a to 40d. In the embodiment, the local oscillation pulse light source 15 outputs a pulse light having a given repeating frequency. For example, a semiconductor laser having a modulator integrally may be used as the local oscillation pulse light source 15.

The divider 16 divides an optical signal received from the local oscillation pulse light source 15. The number of the divided optical signals is the same as that of the coherent receiver front ends. In FIG. 5, the divider 16 divides the received optical signal into four transmission links (a first transmission link to a fourth transmission link). The delay 17 adds a delay amount to a light output from the divider 16. The delay 17 makes difference in the delay amounts of each divided transmission path by one symbol of an input light. In concrete, the delay amount of the second transmission path is set to be one symbol, the delay amount of the third transmission path is set to be two symbols, and the delay amount of the fourth transmission path is set to be three symbols. The coherent receiver front ends 40a to 40d receive the optical signal of which delay amount is set by the delay 17.

Figure 6:
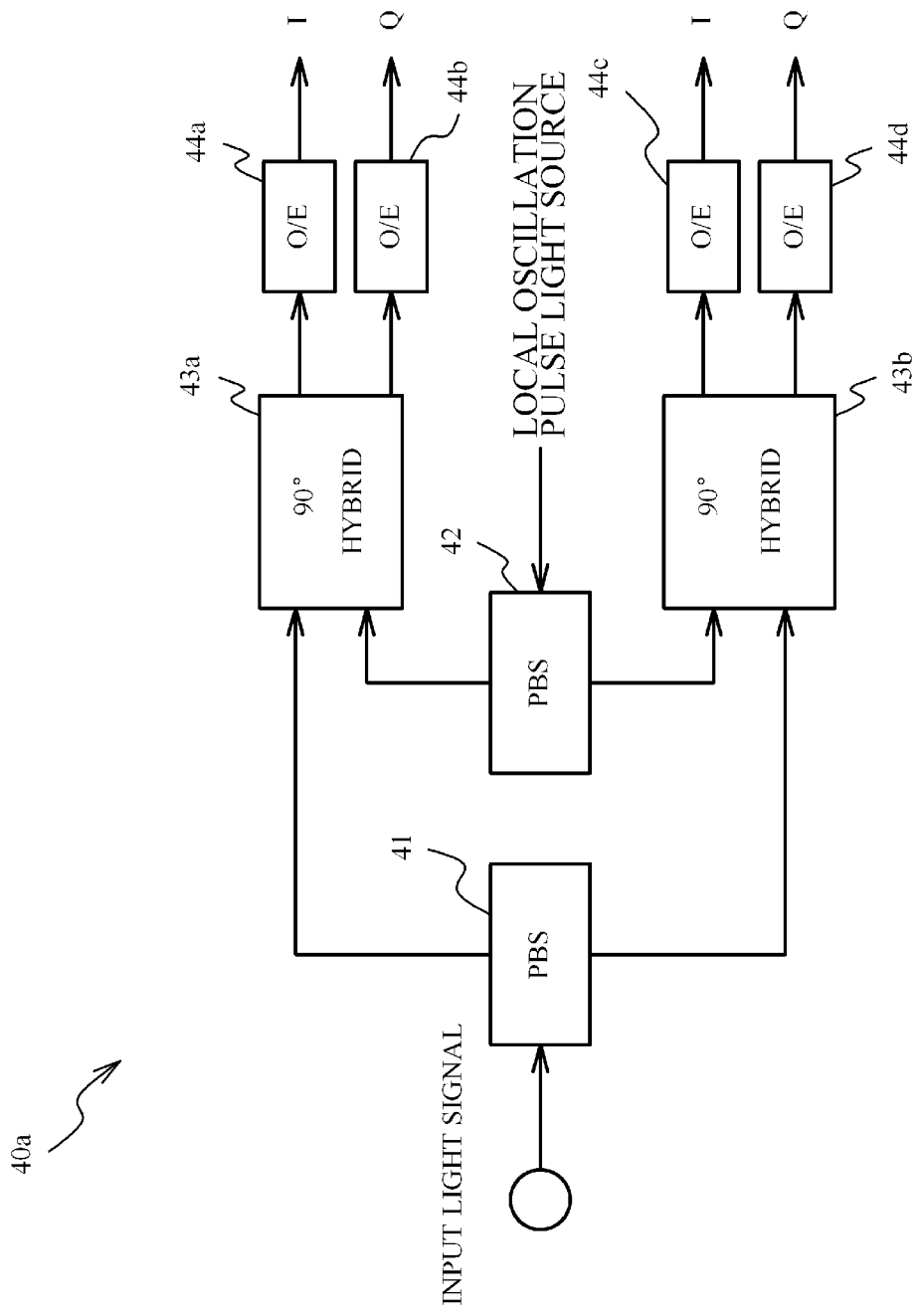
FIG. 6 illustrates a block diagram of a coherent receiver front end.

FIG. 6 illustrates a block diagram of the coherent receiver front end 40a. The coherent receiver front ends 40b to 40d have the same structure as the coherent receiver front end 40a. As illustrated in FIG. 6, the coherent receiver front end 40a includes polarization beam splitters (PBS) 41 and 42, 90 degrees hybrids 43a and 43b and optical/electrical converters 44a to 44d. The polarization beam splitters 41 and 42 and the 90 degrees hybrids 43a and 43b act as a waveform detector for detecting a waveform of an optical signal that the coherent receiver front end 40a receives from a transmission link.

The polarization beam splitter 41 divides a signal received from the divider 14 through the transmission path into two orthogonal polarized lights. The polarization beam splitter 41 inputs one of the two polarized lights into the 90 degrees hybrids 43a and the other into the 90 degrees hybrid 43b. The polarization beam splitter 42 divides a local oscillation light from the divider 16 into two orthogonal polarized lights and inputs each of the two polarized lights into each of the 90 degrees hybrids 43a and 43b according to the polarized lights provided by the polarization beam splitter 41. The 90 degrees hybrid 43a detects a waveform of the polarized lights from the transmission path at receiving timing of the local oscillation light and outputs a waveform detection light of an I-phase light and a Q-phase light. Therefore, the 90 degrees hybrid 43a outputs the I-phase light and the Q-phase light of one (for example, the X-polarized waveform) of the orthogonal polarized waveforms as the waveform detection light. Similarly, the 90 degrees hybrid 43b outputs the I-phase waveform and the Q-phase waveform of the other (for example, the Y-polarized waveform).

The optical/electrical converters 44a to 44d convert two polarized waveforms including the I-phase light and the Q-phase light into electrical signals. In the embodiment, the optical/electrical converter 44a converts the I-phase light of the X-polarized light into an electrical signal. The optical/electrical converter 44b converts the Q-phase light of the X-polarized light into an electrical signal. The optical/electrical converter 44c converts the I-phase light of the Y-polarized light into an electrical signal. The optical/electrical converter 44d converts the Q-phase light of the Y-polarized light into an electrical signal.

The analog/digital converter 50 has an analog/digital converter according to the optical/electrical converters 44a to 44d. Each of the optical/electrical converters converts an output current of the optical/electrical converts 44a to 44d into a digital signal and inputs the digital signal into the processor 60. The processor 60 includes a waveform equalizer, carrier phase recovery, a decoder, an error corrector, and so on. The processor 60 processes the input digital signal.

Next, a description will be given of the number of the coherent receiver front ends. The number of the coherent receiver front ends is determined according to the polarization rotation frequency fs/K at the polarization pre-rotator 21 of the input-electrical-waveform generator 20. In concrete, the number of the coherent receiver front ends is set to be "K". The repeating frequency of the local oscillation pulse light source 15 is set to be fs/K [Hz]. That is, the repeating frequency of the local oscillation pulse light source 15 is set to be the same as the polarization rotation frequency of the polarization pre-rotator 21. The duty of the pulse is set to be less than 1/K. In this case, the optical signal received by the optical receiver 200 is time-division-multiple separated into 1:K. Therefore, it is not necessary to use high-speed devices for canceling the high-speed polarization rotation by the optical transmitter 100.

Therefore, the "K" is set to be two or more for cancelling the polarization rotation. The number of the coherent receiver front ends is set to be "K" for time-division-multiplex separation of an optical signal into 1:K. In an example of FIG. 6, the number of separation of the time-division-multiplex is set to be 4. In FIG. 5 and FIG. 6, the "K" means the number of separation of the time-division-multiplex.

Second Embodiment

Figure 7:
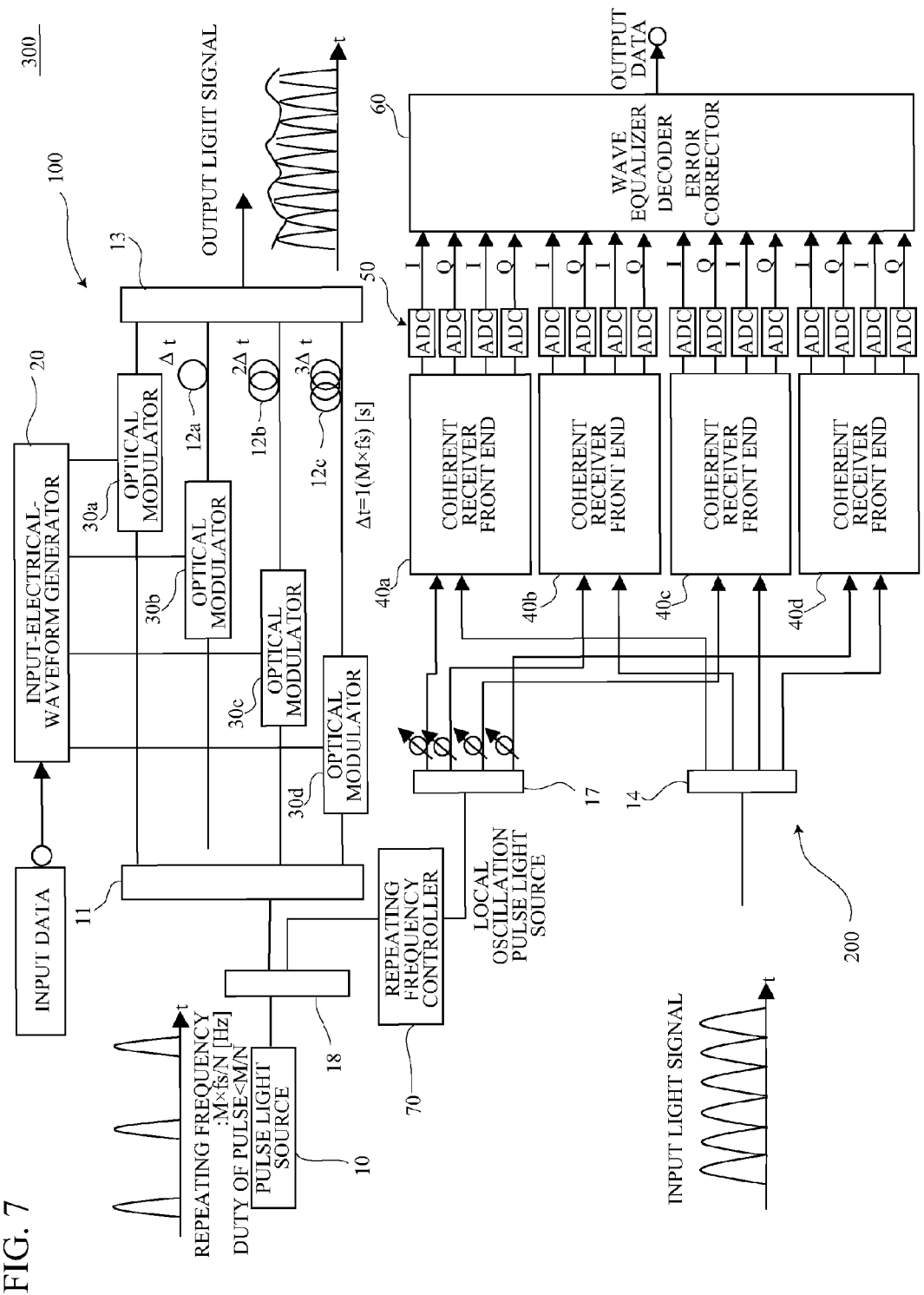
FIG. 7 illustrates a block diagram of an overall structure of an optical transmitter and receiver in accordance with a second embodiment.

FIG. 7 illustrates a block diagram of an overall structure of an optical transmitter and receiver 300 in accordance with a second embodiment. As illustrated in FIG. 7, the optical transmitter and receiver 300 has an optical receiver 200 and the optical transmitter 100 in accordance with the first embodiment. Further, the optical transmitter and receiver 300 has a repeating frequency controller 70. The optical transmitter and receiver 300 is located at each telephone office. An optical signal received by the optical receiver 200 is subjected to a given processing and is transmitted from the optical transmitter 100.

In the optical transmitter 100, a divider 18 is provided between the pulse light source 10 and the divider 11. The divider 18 divides an output light of the pulse light source 10. The divider 18 inputs one of the divided lights into the divider 11 and inputs the other into the repeating frequency controller 70. The repeating frequency controller 70 changes the repeating frequency of the output light of the pulse light source 10 to a given value and inputs the given value to the divider 16.

It is assumed that the repeating frequency of the pulse light source 10 is set to be M×fs/N [Hz] and the duty of the pulse of the pulse light source 10 is set to be less than M/N. In this case, the optical receiver 200 separates an optical signal into K optical signals. With the process, the output light of the pulse light source 10 can be used for both optical modulation and canceling of polarization rotation, when at least one of the following equations 2, 3, and 4 is satisfied.

$$K=M/N \quad \text{[Equation 2]}$$

$$K \times M/N = 2m(\text{"}m\text{" is a natural number}) \quad \text{[Equation 3]}$$

$$K \times M/N = 1/2n(\text{"}n\text{" is a natural number}) \quad \text{[Equation 4]}$$

Figure 8:
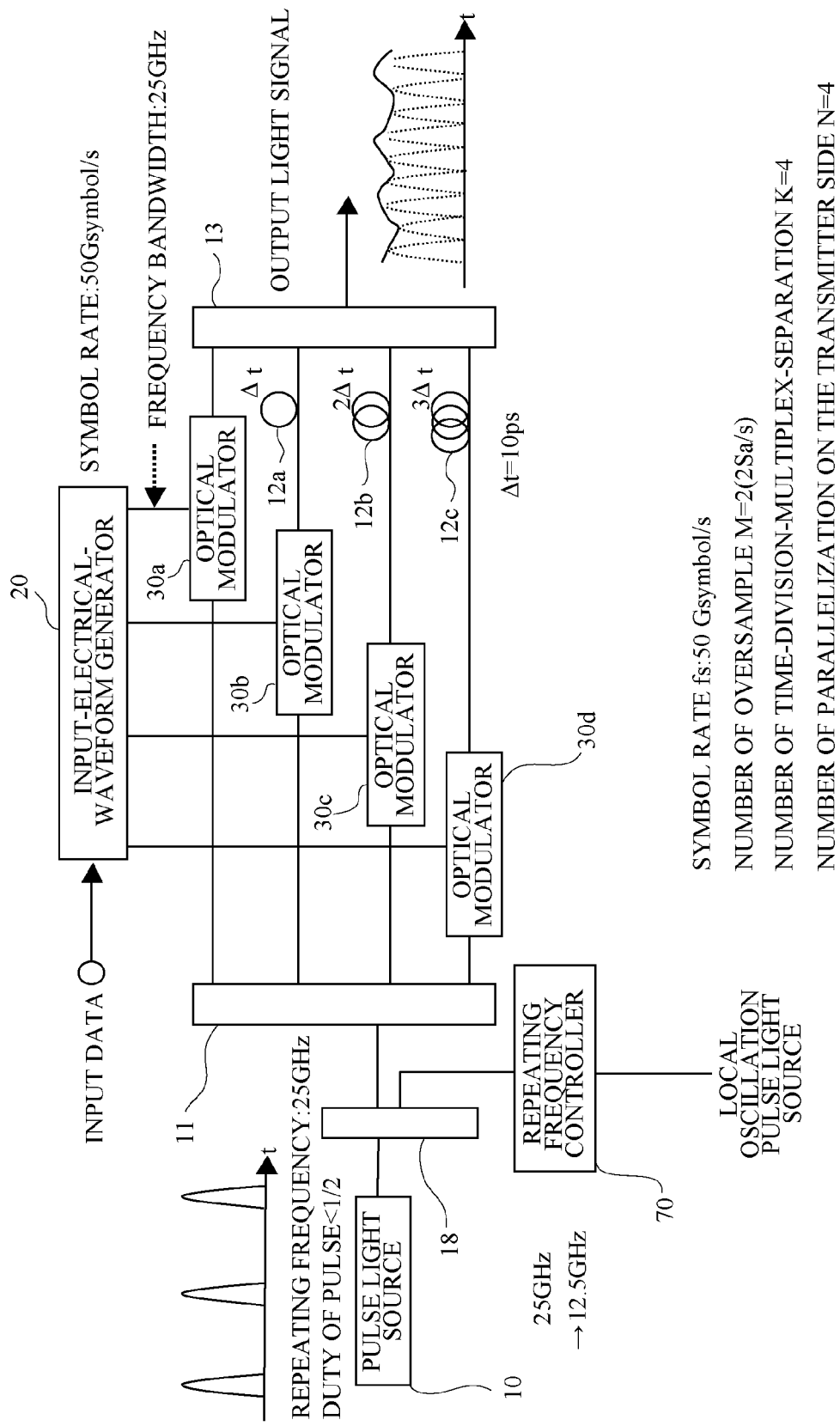
FIG. 8 illustrates an example of concrete values of each parameter.

FIG. 8 illustrates an example of concrete values of each parameter. As illustrated in FIG. 8, it is assumed that the symbol rate "fs" of the input data is 50G symbol/s. It is assumed that "M" is 2, the number of the time-division-multiplex separation "K" is 4, and the division number of the optical transmitter 100 "N" is 4. In this case, the repeating frequency M×fs/N [Hz] of the pulse light source 10 is 25 GHz. The duty of the pulse is less than ½. The frequency bandwidth is 25 GHz. The repeating frequency "M×fs/N" is 12.5 GHz.

Figure 9A:
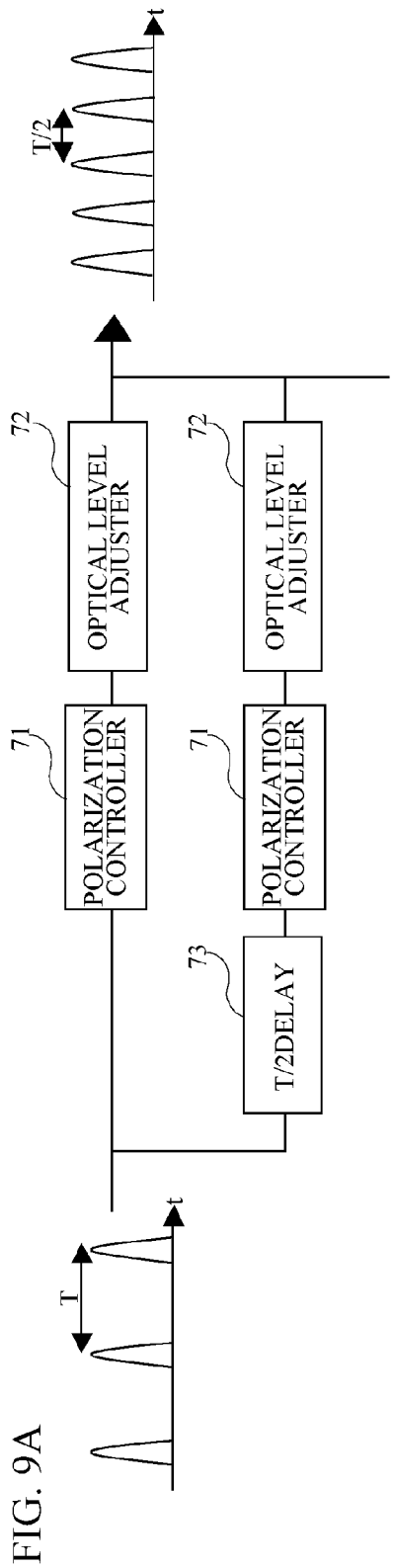
FIG. 9A and FIG. 9B illustrate an example of a repeating frequency controller.
Figure 9B:
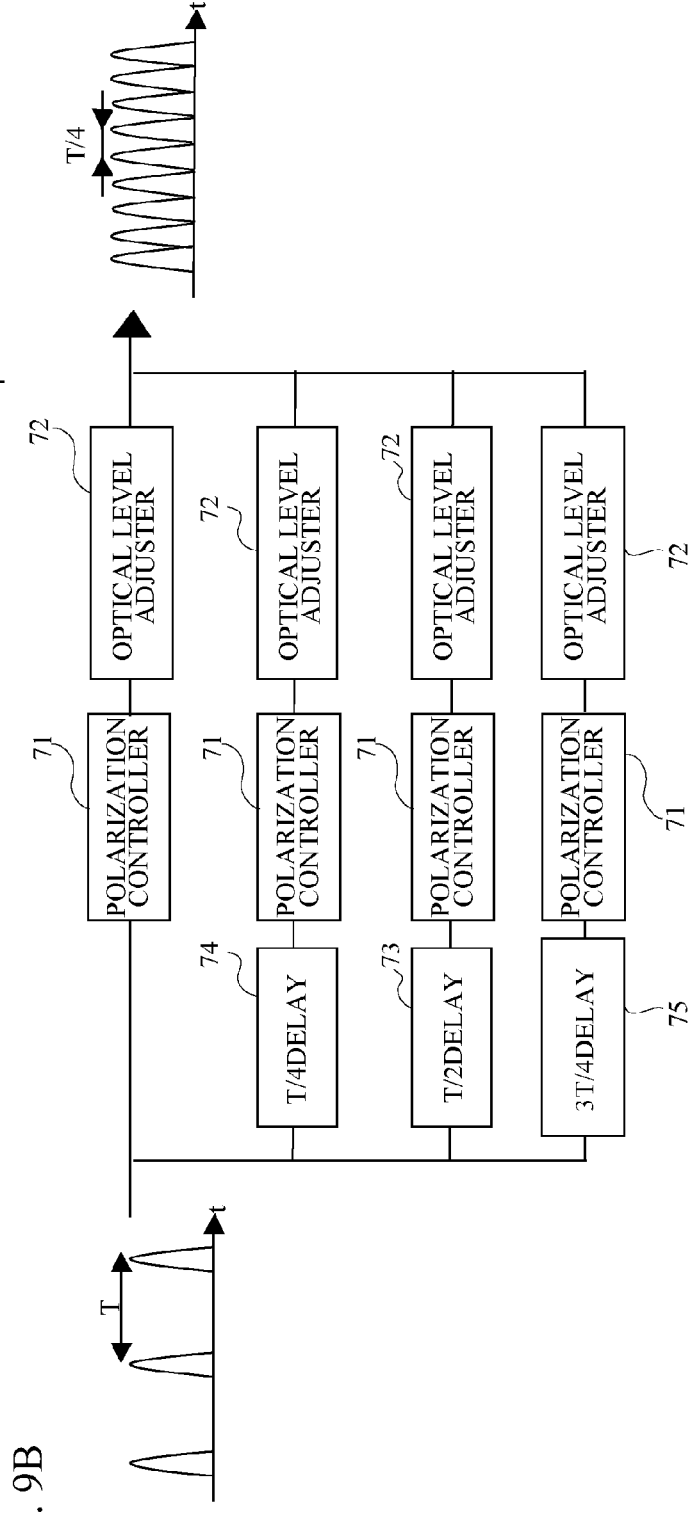

FIG. 9A and FIG. 9B illustrate an example of the repeating frequency controller 70. It is assumed that the repeating frequency of the pulse light source 10 is "T". FIG. 9A illustrates a structure example in which the repeating frequency controller 70 changes the repeating frequency to "T/2". That is, FIG. 9A illustrates an example in which the repeating frequency is doubled.

As illustrated in FIG. 9A, the repeating frequency controller 70 has two transmission paths. One of the two transmission paths has a polarization controller 71 and an optical level adjuster 72. The other has a T/2 delay 73, another polarization controller 71 and another optical level adjuster 72. In this case, an optical signal is delayed by T/2 in the transmission path having the T/2 delay 73. Therefore, the repeating frequency is doubled when two lights passing through the two transmission paths are combined at an optical coupler.

FIG. 9B illustrates a structure example in which the repeating frequency controller 70 changes the repeating frequency to "T/4". That is, FIG. 9B illustrates an example in which the repeating frequency is quadruplicated. As illustrated in FIG. 9B, the repeating frequency controller 70 has four transmission paths. A first transmission path has the polarized waveform controller 71 and an optical level adjuster 72. A second transmission path, a third transmission path and a fourth transmission path have one of the T/2 delay 73, a T/4 delay and a 3T/4 delay 75, in addition to the polarization controller 71 and the optical level adjuster 72. In this case, an optical signal is delayed by T/2 in the second transmission path. An optical signal is delayed by T/4 in the third transmission path. An optical signal is delayed by 3T/4 at the fourth transmission path. Therefore, the repeating frequency is quadruplicated when four lights passing through the four transmission paths are combined at an optical coupler.

Figure 10:
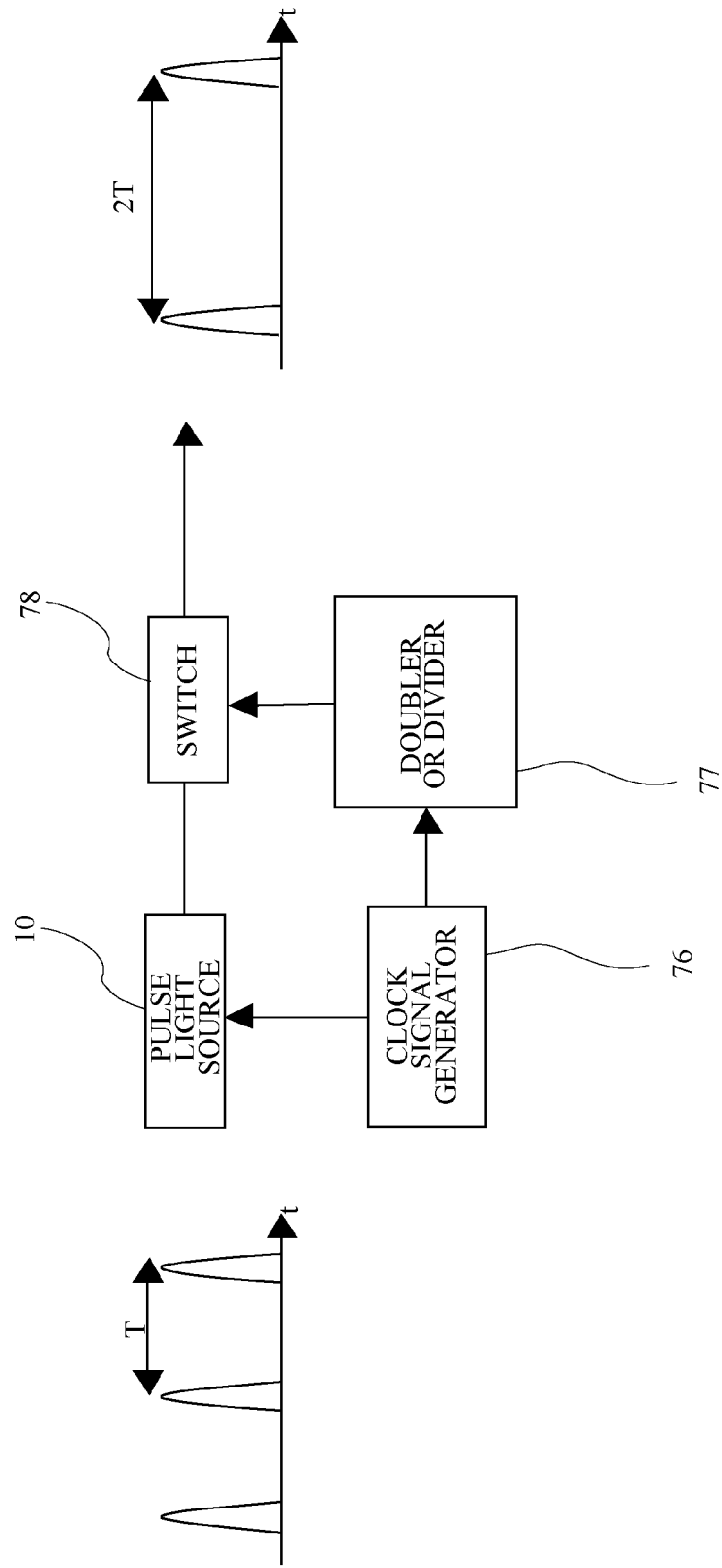
FIG. 10 illustrates another example of the repeating frequency controller.

FIG. 10 illustrates another example of the repeating frequency controller 70. As illustrated in FIG. 10, the repeating frequency controller 70 has a clock signal generator 76, a frequency doubler 77 and a switch 78. A frequency divider may be provided instead of the frequency doubler 77. The switch 78 may be an LN modulator, an EA modulator or the like. In the structure of FIG. 10, a part of an output pulse of the pulse light source 10 can be cut off when the switch 78 turns on and turns off according to the clock of the clock signal generator 76. Thus, the repeating frequency can be integer times or 1/integer times.

In the above embodiments, the input-electrical-waveform generator 20 acts as a pre-compensator, the delays 12a to 12c and the composer 13 act as a time-division multiplexer, the polarization pre-rotator 21 acts as a polarization rotator.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. An optical transmitter comprising:
   a pre-compensator calculating an electrical field of an optical signal subjected to an electronic pre-compensation with respect to an input digital signal;
   a parallelizer parallelizing the electrical field of the optical signal calculated by the pre-compensator;
   a plurality of optical modulators modulating an optical signal based on each of parallelized electrical fields of optical signals;
   time-division multiplexer time-division-multiplexing an optical signal output from the plurality of the optical modulators and
   a polarization rotator processing the input digital signal so that the optical signal modulated by the optical modulator is polarization-scrambled with a polarized wave rotation frequency fs/K, the fs being a symbol rate, the K being a number of separation of time-division-multiplex.

2. The optical transmitter as claimed in claim 1, wherein the pre-compensator processes the input digital signal so that the optical signal modulated by the optical modulator is pre-equalized.

3. The optical transmitter as claimed in claim 1, wherein the optical modulator is a polarization multiplexing modulator modulating each of orthogonal polarized-waveforms independently.

4. An optical transmitter and receiver system comprising:
   an optical transmitter having a pre-compensator, a parallelizer, a plurality of optical modulators and a time-division multiplexer, the pre-compensator calculating an electrical field of an optical signal subjected to an electronic pre-compensation with respect to an input digital signal, the parallelizer parallelizing the electrical field of the optical signal calculated by the pre-compensator, the plurality of optical modulators modulating an optical signal based on each of parallelized optical signal electrical field, the time-division multiplexer time-division-multiplexing an optical signal output from the plurality of the optical modulators; and
   an optical receiver having a waveform detector detecting a waveform with use of local oscillation light including a repeating pulse with respect to an optical signal input from the optical transmitter through a transmission link,
   wherein a repeating frequency of the local oscillation light is the same as a polarization rotation frequency of an optical signal output from the optical transmitter.

5. The optical transmitter and receiver system as claimed in claim 4, wherein the number of the waveform detector in the optical receiver is a constant value "K" when the polarization rotation frequency is a value obtained by dividing a frequency of the digital signal fed into the optical transmitter by the "K".

6. The optical transmitter and receiver system as claimed in claim 5, wherein each of the waveform detectors detects a waveform at timing different from each other by a symbol rate of the digital signal fed into the optical transmitter.

7. The optical transmitter and receiver system as claimed in claim 6, wherein a value obtained by dividing the "K" by the number of the optical modulators is a multiple of 2 or a reciprocal of a multiple of 2.

8. An optical transmitting method comprising:
   calculating an electrical field of an optical signal subjected to an electronic pre-compensation with respect to an input digital signal;
   parallelizing the electrical field of the optical signal calculated by the calculating of the electrical field of the optical signal;
   modulating an optical signal based on each of parallelized electrical fields of optical signals in each of optical modulators;
   time-division-multiplexing an optical signal output from the optical modulators; and
   processing the input digital signal so that the optical signal modulated by the optical modulator is polarization-scrambled with a polarized wave rotation frequency fs/K, the fs being a symbol rate, the K being a number of separation of time-division-multiplex.

9. An optical transmitting and receiving method comprising:
   detecting a waveform with use of a local oscillation light including a repeating pulse with respect to an optical signal transmitted according to an optical transmitting method, the method comprising: calculating an electrical field of an optical signal subjected to an electronic pre-compensation with respect to an input digital signal; parallelizing the electrical field of the optical signal calculated by the calculating of the electrical field of the optical signal; modulating an optical signal based on each of parallelized electrical field of the optical signal in each of optical modulators; and time-division-multiplexing an optical signal output from the optical modulators,
   wherein a repeating frequency of the local oscillation light is the same as a polarization rotation frequency of the optical signal transmitted according to the optical transmitting method.

* * * * *